(12) United States Patent
Matsunaga et al.

(10) Patent No.: US 11,104,977 B2
(45) Date of Patent: *Aug. 31, 2021

(54) COPPER ALLOY FOR ELECTRONIC/ELECTRIC DEVICE, COPPER ALLOY SHEET/STRIP MATERIAL FOR ELECTRONIC/ELECTRIC DEVICE, COMPONENT FOR ELECTRONIC/ELECTRIC DEVICE, TERMINAL, AND BUSBAR

(71) Applicant: MITSUBISHI MATERIALS CORPORATION, Tokyo (JP)

(72) Inventors: Hirotaka Matsunaga, Kitamoto (JP); Kenichiro Kawasaki, Kitamoto (JP); Hiroyuki Mori, Tsukuba (JP); Kazunari Maki, Saitama (JP); Yoshiteru Akisaka, Aizuwakamatsu (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/976,351

(22) PCT Filed: Mar. 28, 2019

(86) PCT No.: PCT/JP2019/013552
§ 371 (c)(1),
(2) Date: Aug. 27, 2020

(87) PCT Pub. No.: WO2019/189558
PCT Pub. Date: Oct. 3, 2019

(65) Prior Publication Data
US 2021/0002743 A1    Jan. 7, 2021

(30) Foreign Application Priority Data

Mar. 30, 2018 (JP) .............................. JP2018-069097

(51) Int. Cl.
*C22C 9/00* (2006.01)
*C22F 1/08* (2006.01)
(Continued)

(52) U.S. Cl.
CPC .................. *C22C 9/00* (2013.01); *C22F 1/08* (2013.01); *H01B 1/026* (2013.01); *B60M 1/30* (2013.01)

(58) Field of Classification Search
CPC .. C22C 9/00; H01B 1/026; C22F 1/08; B60M 1/30
See application file for complete search history.

(56) References Cited

U.S. PATENT DOCUMENTS 3,677,745 A    7/1972 Finlay et al.
3,778,318 A *  12/1973 Finlay et al. ............. F28F 1/32
                                                         148/682

(Continued)

FOREIGN PATENT DOCUMENTS

CN    1574107 A    2/2005
CN    1924048 A    3/2007

(Continued)

OTHER PUBLICATIONS

Kronberg et al., "Secondary Recrystallization in Copper" *Metals Transactions*, Aug. 1949, pp. 501-514, vol. 185.

(Continued)

*Primary Examiner* — John A Hevey
(74) *Attorney, Agent, or Firm* — Leason Ellis LLP (57) ABSTRACT

A copper alloy includes, by mass %: Mg: 0.15%-0.35%; and P: 0.0005%-0.01%, with a remainder being Cu and unavoidable impurities, wherein [Mg]+20×[P]<0.5 is satisfied. Among the unavoidable impurities, H is 10 mass ppm or less, O is 100 mass ppm or less, S is 50 mass ppm or less, and C is 10 mass ppm or less. In addition, 0.20<(NF$_{J2}$/(1-

(Continued)

$NF_{J3}))^{0.5} \leq 0.45$ is satisfied where a proportion of J3, in which all three grain boundaries constituting a grain boundary triple junction are special grain boundaries, to a total grain boundary triple junctions is $NF_{J3}$, and a proportion of J2, in which two grain boundaries constituting a grain boundary triple junction are special grain boundaries and one grain boundary is a random grain boundary, to the total grain boundary triple junctions is $NF_{J2}$.

10 Claims, 1 Drawing Sheet

(51) Int. Cl.
*H01B 1/02* (2006.01)
*B60M 1/30* (2006.01)

(56) References Cited

U.S. PATENT DOCUMENTS

| | | | |
|---|---|---|---|
| 5,486,244 | A | 1/1996 | Caron et al. |
| 5,667,752 | A | 9/1997 | Suzuki et al. |
| 10,128,019 | B2 * | 11/2018 | Matsunaga ............ H01B 1/026 |
| 10,157,694 | B2 | 12/2018 | Ito et al. |
| 10,453,582 | B2 * | 10/2019 | Matsunaga ............ H01B 5/02 |
| 10,676,803 | B2 * | 6/2020 | Matsunaga ............ C22C 9/00 |
| 2002/0044881 | A1 | 4/2002 | Breedis et al. |
| 2004/0238086 | A1 | 12/2004 | Saleh |
| 2008/0298998 | A1 | 12/2008 | Kaneko et al. |
| 2009/0239398 | A1 | 9/2009 | Lynch et al. |
| 2010/0132851 | A1 | 6/2010 | Gao et al. |
| 2010/0269963 | A1 | 10/2010 | Hirose et al. |
| 2011/0146855 | A1 | 6/2011 | Sakurai et al. |
| 2013/0048162 | A1 | 2/2013 | Ito et al. |
| 2014/0193293 | A1 | 7/2014 | Shishido et al. |
| 2014/0209221 | A1 | 7/2014 | Kumagai et al. |
| 2014/0283962 | A1 | 9/2014 | Ito et al. |
| 2015/0037608 | A1 * | 2/2015 | Shinohara ............ H01R 13/03 428/673 |
| 2016/0160321 | A1 * | 6/2016 | Ito ............ C22C 9/00 439/887 |
| 2016/0201179 | A1 * | 7/2016 | Miyagi ............ C22F 1/08 148/554 |
| 2018/0040389 | A1 | 2/2018 | Matsunaga et al. |
| 2018/0171437 | A1 * | 6/2018 | Matsunaga ............ H01B 5/02 |
| 2018/0187292 | A1 | 7/2018 | Matsunaga et al. |
| 2018/0211741 | A1 | 7/2018 | Matsunaga et al. |
| 2019/0048449 | A1 * | 2/2019 | Matsunaga ............ C22C 9/02 |
| 2021/0002743 | A1 | 1/2021 | Matsunaga et al. |

FOREIGN PATENT DOCUMENTS

| | | |
|---|---|---|
| CN | 102108457 A | 6/2011 |
| CN | 102177273 A | 9/2011 |
| CN | 102203916 A | 9/2011 |
| CN | 102753712 A | 10/2012 |
| CN | 102892908 A | 1/2013 |
| CN | 103502486 A | 1/2014 |
| CN | 104822853 A | 8/2015 |
| CN | 105369050 A | 3/2016 |
| CN | 105392908 A | 3/2016 |
| CN | 107208189 A | 9/2017 |
| EP | 3348658 A | 7/2018 |
| EP | 3438299 A1 | 2/2019 |
| JP | 58-199835 A | 11/1983 |
| JP | 61-284946 A | 12/1986 |
| JP | 05-311283 A | 11/1993 |
| JP | 07-018354 A | 1/1995 |
| JP | 2007-056297 A | 3/2007 |
| JP | 2009-007666 A | 1/2009 |
| JP | 2009-228013 A | 10/2009 |
| JP | 2010-126777 A | 6/2010 |
| JP | 2011-174127 A | 9/2011 |
| JP | 2011-241412 A | 12/2011 |
| JP | 2012-007231 A | 1/2012 |
| JP | 5045783 B | 10/2012 |
| JP | 2013-095943 A | 5/2013 |
| JP | 2013-100570 A | 5/2013 |
| JP | 2013-104101 A | 5/2013 |
| JP | 2013-204079 A | 10/2013 |
| JP | 2013-253267 A | 12/2013 |
| JP | 2014-025089 A | 2/2014 |
| JP | 2014-047378 A | 3/2014 |
| JP | 2014-114464 A | 6/2014 |
| JP | 2015-045083 A | 3/2015 |
| JP | 2015-048503 A | 3/2015 |
| JP | 2015-101773 A | 6/2015 |
| JP | 5910790 B | 4/2016 |
| JP | 6156600 B | 7/2017 |
| JP | 6187629 B | 8/2017 |
| JP | 2017-179490 A | 10/2017 |
| JP | 2017-179492 A | 10/2017 |
| JP | 2017-179493 A | 10/2017 |
| JP | 2017-179553 A | 10/2017 |
| JP | 2017-186662 A | 10/2017 |
| JP | 2017-186664 A | 10/2017 |
| TW | 201339328 A | 10/2013 |
| WO | WO-2003/076672 A | 9/2003 |
| WO | WO-2005/028143 A1 | 3/2005 |
| WO | WO-2012/169405 A | 12/2012 |
| WO | WO-2013/062091 A | 5/2013 |
| WO | WO-2013/069687 A | 5/2013 |
| WO | WO-2013/073412 A | 5/2013 |
| WO | WO-2013/150627 A1 | 10/2013 |
| WO | WO-2017/043559 A1 | 3/2017 |
| WO | WO-2017/170733 A1 | 10/2017 |

OTHER PUBLICATIONS

D. G. Brandon, "The Structure of High-Angle Grain Boundaries", *Acta Metallurgica*, Nov. 1966, pp. 1479-1484, vol. 14.
International Search Report dated Jul. 2, 2019 for the corresponding PCT International Application No. PCT/JP2019/013552.
Japanese Office Action dated Nov. 19, 2019 for the corresponding Japanese Patent Application No. 2019-528783.
Office Action dated Jul. 11, 2019 for the related U.S. Appl. No. 15/737,642.
International Search Report dated Jun. 27, 2017 for the related PCT Application No. PCT/JP2017/012914.
Japanese Notice of Allowance dated Sep. 12, 2017 for the related Japanese Patent Application No. 2017-063418.
Chinese Office Action dated Aug. 1, 2019 for the related Chinese Patent Application No. 201780005558.0.
Extended European Search Report dated Nov. 8, 2019 for the related European Patent Application No. 17775233.4.
Jingpu Wang et al., "Cable Materials," Mechanical Industry Press, Nov. 1983, pp. 80-81.
Chinese Office Action dated Jun. 12, 2019 for the related Chinese Patent Application No. 201680008019.8.
David Chapman: "Coatings" in: "Copper for Busbars", May 31, 2014 (May 31, 2014), Copper Development Association, pp. 103-105.
European Office Action dated Feb. 28, 2019 for the related European Patent Application No. 16844412.3.
European Search Report dated Mar. 7, 2019 for the related European Patent Application No. 16844420.6.
Chinese Office Action dated Nov. 27, 2018 for the related Chinese Application No. 201680032061.3.
David Chapman "High Conductivity Copper for Electrical Engineering", May 31, 1998 [Retrieved from the Internet on Jul. 2, 2018].
R. Sundberg et al. "The Cu-Mg-P system: precipitation phenomena and physical properties", *Metal Technology*, Dec. 31, 1979, pp. 230-234, vol. 6, No. 1.
Extended European Search Report dated Jul. 11, 2018 for the related European Patent Application No. 16844412.3.
Chinese Office Action dated Apr. 4, 2018 for the related Chinese Patent Application No. 201680008019.8.

(56) References Cited

OTHER PUBLICATIONS

Chinese Office Action dated Dec. 27, 2018 for the related Chinese Application No. 201680008019.8.
Maki Kazunari et al: "Solid-solution copper alloys with high strength and high electrical conductivity", Scripta Materialia, Elsevier, Amsterdam, NL, vol. 68, No. 10 Jan. 2, 2013 (Jan. 2, 2013), pp. 777-780.
Maki Kazunari et al: "Supplementary information to Solid-solution copper alloys with high strength and high electrical conductivity", Scripta Materialia, vol. 68, No. 10, Jan. 2, 2013 (Jan. 2, 2013), pp. 777-780.
Zhu Chengcheng et al: "Effect of ECAP combined cold working on mechanical properties and electrical conductivity of Conform-produced Cu-Mg alloys", Journal of Alloys and Compounds, vol. 582, Aug. 14, 2013 (Aug. 14, 2013), pp. 135-140.
ASM: "Casting of Copper and Copper Alloys" in: "Casting", Dec. 31, 2008 (Dec. 31, 2008), ASM International, pp. 1026-1048.
European Search Report dated Apr. 17, 2019 for the related European Patent Application No. 16844417.2.
European Search Report dated Apr. 18, 2019 for the related European Patent Application No. 16844438.8.
International Search Report dated Nov. 8, 2016 for the related PCT Application No. PCT/JP2016/076456.
International Search Report dated Nov. 8, 2016 for the related PCT Application No. PCT/JP2016/076362.
International Search Report dated Nov. 8, 2016 for the related PCT Application No. PCT/JP2016/076376.
International Search Report dated Dec. 6, 2016 for the related PCT Application No. PCT/JP2016/076387.
Japanese Notice of Allowance dated May 9, 2017 for the related Japanese Patent Application No. 2016-575989.
Office Action dated Aug. 28, 2019 for the related U.S. Appl. No. 15/741,148.
Non-Final Office Action dated Apr. 1, 2020 for the related U.S. Appl. No. 15/737,642.
Final Office Action dated Nov. 14, 2019 for the related U.S. Appl. No. 15/737,642.
Non-Final Office Action dated Sep. 5, 2018 for the related U.S. Appl. No. 15/543,664.

Nomura, "Technical Trends in High Performance Copper Alloy Strip for Connector and Kobe Steel's Development Strategy", *Kobe Steel Works Engineering Reports,* Apr. 2004, pp. 2-8, vol. 54 No. 1.
Hori, et al., "Intergranular (Grain boundary) precipitation in a Cu-Mg alloy", *Journal of the Japan Copper and Brass Research Association,* 1980, pp. 115-124, vol. 19.
International Search Report dated Jan. 27, 2015 for the corresponding PCT Application No. PCT/JP2014/078031.
Japanese Office Action dated Oct. 27, 2015 for the corresponding Japanese Patent No. 2013-256310.
Taiwanese Office Action dated Nov. 9, 2015 for the corresponding Taiwanese Patent No. 103138036.
J.R. Davis, edited, "ASM Speciality Handbook-Copper and its alloys", Aug. 2001, pp. 15, *ASM International,* Materials Park, U.S.A.
E.G. West, "Copper and its alloys", 1982, pp. 129, *Ellis Horwood Limited,* Chichester, England.
Extended European Search Report dated Jul. 17, 2017 for the corresponding European Patent Application No. 14869335.1.
Chinese Office Action dated Apr. 14, 2017 for the corresponding Chinese Patent Application No. 201480065514.3.
Notice of Allowance dated Feb. 5, 2020 for the related U.S. Appl. No. 15/741,148.
Office Action dated Aug. 18, 2020 for the related U.S. Appl. No. 16/076,617.
Extended European Search Report dated Nov. 19, 2019 for the related European Patent Application No. 17775267.2.
International Search Report dated Jun. 27, 2017 for the related PCT Application No. PCT/JP2017/012993.
Notice of Allowance dated Sep. 12, 2017 for the related Japanese Patent Application No. 2017-063258.
Chinese Office Action dated Aug. 28, 2019 for the related Chinese Patent Application No. 201780005496.3.
U.S. Office Action dated Mar. 16, 2021 for the related U.S. Appl. No. 16/076,257.
Chinese Office Action dated May 10, 2021 for the corresponding Chinese Patent Application No. 201980015759.8.
Korean Notice of Allowance dated Jun. 24, 2021 for the correponding Korean Patent Application No. 10-2018-7021014.

* cited by examiner

COPPER ALLOY FOR ELECTRONIC/ELECTRIC DEVICE, COPPER ALLOY SHEET/STRIP MATERIAL FOR ELECTRONIC/ELECTRIC DEVICE, COMPONENT FOR ELECTRONIC/ELECTRIC DEVICE, TERMINAL, AND BUSBAR

CROSS-REFERENCE TO RELATED PATENT APPLICATIONS

This application is a U.S. National Phase Application under 35 U.S.C. § 371 of International Patent Application No. PCT/JP2019/013552 filed Mar. 28, 2019 and claims the benefit of priority to Japanese Patent Applications No. 2018-069097 filed Mar. 30, 2018, all of which are incorporated herein by reference in their entirety. The International Application was published in Japanese on Oct. 3, 2019 as International Publication No. WO/2019/189558 under PCT Article 21(2).

FIELD OF THE INVENTION

The present invention relates to a copper alloy for electronic or electric (electronic/electric) devices (electronic devices or electric devices) suitable for a component for electronic or electric devices, for example, a terminal such as a connector or a press-fit connector, a busbar, or the like; a copper alloy plate or strip material (copper alloy sheet/strip material) (copper alloy plate material or copper alloy strip material) for electronic or electric devices including this copper alloy for electronic or electric devices; a component for electronic or electric devices; a terminal; and a busbar.

BACKGROUND OF THE INVENTION

In the related art, copper or a copper alloy with high electrical conductivity has been used as a component for electronic or electric devices, for example, a terminal such as a connector or a press-fit connector, a busbar, or the like.

Since a current in electronic devices and electric devices is increased, components for electronic or electric devices which are used in these electronic devices and electric devices are increased in size and thickness in order to reduce a current density and diffuse the heat due to Joule heat. Therefore, materials constituting components for electronic or electric devices are required to have high electrical conductivity, punching formability during press working, and favorable bending formability. Furthermore, terminals such as a connector, and the like which are used in a high temperature environment such as an engine room of a vehicle are required to have stress relaxation resistance.

A Cu—Mg-based alloy is suggested in Japanese Unexamined Patent Application, First Publication No. 2007-056297 and Japanese Unexamined Patent Application, First Publication No. 2014-114464 as the material used for the component for electronic or electric devices, for example, a terminal such as a connector or a press-fit connector, a busbar, or the like.

In the Cu—Mg-based alloy described in Japanese Unexamined Patent Application, First Publication No. 2007-056297, since the amount of P is in a range of 0.08 to 0.35 mass % which is large, cold workability (formability) and bending formability are insufficient and it is difficult to form the alloy into a component for electronic or electric devices having a predetermined shape.

Furthermore, in the Cu—Mg-based alloy described in Japanese Unexamined Patent Application, First Publication No. 2014-114464, since the amount of Mg is in a range of 0.01 to 0.5 mass % and the amount of P is in a range of 0.01 to 0.5 mass %, a coarse crystallized material is generated and thus cold workability and bending formability are insufficient.

In the above-described Cu—Mg-based alloy, the viscosity of a molten copper alloy is increased due to Mg. Accordingly, there is a problem in that the castability is degraded in a case where P is not added.

In addition, as described above, due to a recent increase in the current of electronic devices and electric devices, a thickness of materials constituting components for electronic or electric devices has been increased. However, when the thickness is increased, there is a problem that a burr height generated at the time of punching increases and punching formability at the time of press working deteriorates.

Furthermore, when a thickness increases, a large bending stress tends to act during bending working; and therefore, particularly in a case of performing complicated bending working, excellent bending formability is required as compared to the case of the related art.

In Japanese Unexamined Patent Application, First Publication No. 2007-056297 and Japanese Unexamined Patent Application, First Publication No. 2014-114464, the amount of O or the amount of S has not been considered. Therefore, there is a concern that defects occur during working due to generation of inclusions including Mg oxide or Mg sulfide and thus the cold workability and the bending formability deteriorate. Furthermore, since the amount of H has not been considered, there is a concern that defects occur during working due to occurrence of blow hole defects in an ingot and thus the cold workability and the bending formability deteriorate. In addition, since the amount of C has not been considered, there is a concern that the cold workability deteriorates due to defects caused by including C during casting.

Problems to be Solved by the Invention

The present invention has been made in consideration of the above-described circumstances. An object thereof is to provide a copper alloy for electronic or electric devices which is excellent in electrical conductivity, strength, bending formability, stress relaxation resistance, castability, and punching formability; and a copper alloy plate or strip material for electronic or electric devices, and to provide a component for electronic or electric devices, a terminal, and a busbar which include this copper alloy plate or strip material for electronic or electric devices.

SUMMARY OF THE INVENTION

Solutions for Solving the Problems

As a result of intensive studies by the inventors of the present invention to achieve this object, the following findings were obtained. By setting amounts of Mg and P in an alloy within a range of a predetermined relational expression, and further specifying amounts of H, O, C, and S, which are unavoidable impurities, it is possible to reduce the amount of crystallized materials containing Mg and P and inclusions including Mg oxides, Mg sulfides, and the like. Accordingly, it is possible to improve strength, stress relaxation resistance, and castability without lowering cold workability (formability) and bending formability.

In addition, in the above-mentioned copper alloy, a surface orthogonal to a rolling width direction was used as an observation surface, and a matrix was analyzed by an EBSD method. As a result, it was found that, by specifying the proportions of a special grain boundary and a random grain boundary which constitute a grain boundary triple junction, cracks could easily propagate along grain boundaries during press working, and punching formability during the press working could be improved.

In order to achieve the object, a copper alloy for an electronic or electric device according to an aspect of the present invention includes: Mg at an amount in a range of 0.15 mass % or greater and less than 0.35 mass %; and P at an amount in a range of 0.0005 mass % or greater and less than 0.01 mass %, with a remainder being Cu and unavoidable impurities, wherein an amount of Mg [Mg] and an amount of P [P] in terms of mass ratio satisfy a relation: [Mg]+20×[P]<0.5, an amount of H is 10 mass ppm or less, an amount of O is 100 mass ppm or less, an amount of S is 50 mass ppm or less, and an amount of C is 10 mass ppm or less, all of which are the unavoidable impurities, and a surface orthogonal to a rolling width direction is used as an observation surface, measurement regarding a matrix is performed on a measurement area of 10,000 μm² or larger at every measurement intervals of 0.25 μm by an EBSD method, measured results are analyzed by data analysis software OIM to obtain a CI value in each measurement point, a measurement point in which a CI value is 0.1 or less is removed, a boundary having more than 150 of an orientation difference between neighboring measuring points is assigned as a grain boundary, a coincidence boundary in which a value is 29 or less is defined as a special grain boundary, and the remaining grain boundaries are defined as random grain boundaries, then, with regard to grain boundary triple junctions analyzed by the OIM, $0.20<(NF_{J2}/(1-NF_{J3}))^{0.5}\leq0.45$ is satisfied in a case where a proportion of J3, in which all three grain boundaries constituting a grain boundary triple junction are special grain boundaries, to total grain boundary triple junctions is represented by $NF_{J3}$, and a proportion of J2, in which two grain boundaries constituting a grain boundary triple junction are special grain boundaries and one grain boundary is a random grain boundary, to the total grain boundary triple junctions is represented by $NF_{J2}$.

The EBSD method means an Electron Backscatter Diffraction Patterns (EBSD) method using a scanning electron microscope equipped with a backscattered electron diffraction image system, and the OIM is data analysis software (Orientation Imaging Microscopy: OIM) for analyzing crystal orientations using data measured by the EBSD. In addition, the CI value is a confidence index and is a numerical value displayed as a numerical value indicating reliability of crystal orientation determination when analysis is performed using the analysis software OIM Analysis (Ver.7.2) of an EBSD apparatus (for example, "EBSD Reader: Using OIM (Revised 3rd Edition)" written by Seiichi Suzuki, September 2009, TSL Solutions Inc.).

In a case where a structure of a measurement point which is measured by the EBSD method and analyzed by the OIM is a deformed structure, a crystal pattern is not clear; and therefore, reliability for crystal orientation determination is decreased and the CI value is decreased. In particular, in a case where the CI value is 0.1 or less, the structure of the measurement point is determined to have a deformed structure.

The special grain boundary is defined as a coincidence boundary in which a Σ value satisfies a relationship of 3≤E≤29, and the Σ value is crystallographically defined based on CSL theory (Kronberg et al: Trans. Met. Soc. AIME, 185, 501 (1949)), and the coincidence boundary is a grain boundary in which the maximum permissible deviation Dq from coincidence satisfies a relationship of Dq≤15°/$\Sigma^{1/2}$ (D. G. Brandon: Acta. Metallurgica. Vol. 14, p. 1479, (1966)).

The random grain boundaries are grain boundaries other than a special grain boundary which has a coincidence orientation relationship in which a Σ value is 29 or less and satisfies Dq≤15°/$\Sigma^{1/2}$. That is, the special grain boundary has a coincidence orientation relationship in which a Σ value is 29 or less and satisfies Dq≤15°/$\Sigma^{1/2}$, and grain boundaries other than this special grain boundary are random grain boundaries.

As the grain boundary triple junction, four types exist, and these are J0 in which all three grain boundaries are random grain boundaries, J1 in which one grain boundary is a special grain boundary and two grain boundaries are random grain boundaries, J2 in which two grain boundaries are special grain boundaries and one grain boundary is a random grain boundary, and J3 in which all three grain boundaries are special grain boundaries.

Accordingly, a proportion $NF_{J3}$ of J3, in which all three grain boundaries constituting a grain boundary triple junction are special grain boundaries, to total grain boundary triple junctions (a ratio of the number of J3 to the number of all grain boundary triple junctions) is defined by $NF_{J3}=J3/(J0+J1+J2+J3)$.

Furthermore, a proportion $NF_{J2}$ of J2 in which two grain boundaries constituting a grain boundary triple junction are special grain boundaries and one grain boundary is a random grain boundary, to total grain boundary triple junctions (a ratio of the number of J2 to the number of all grain boundary triple junctions) is defined by $NF_{J2}=J2/(J0+J1+J2+J3)$.

According to the copper alloy for electronic or electric devices with the above-described configuration, the amount of Mg is 0.15 mass % or greater and less than 0.35 mass %. Therefore, by dissolving Mg in a matrix of copper, strength and stress relaxation resistance can be improved without greatly degrading the electrical conductivity.

Further, since the amount of P is 0.0005 mass % or greater and less than 0.01 mass %, the viscosity of a molten copper alloy containing Mg can be reduced; and thereby, castability can be improved.

Further, since the amount [Mg] of Mg and the amount [P] of P in terms of mass ratio satisfy a relation of [Mg]+20×[P]<0.5, generation of a coarse crystallized material containing Mg and P can be inhibited and degradation of cold workability and bending formability can be inhibited.

In addition, a surface orthogonal to a rolling width direction is used as an observation surface, measurement regarding a matrix is performed on a measurement area of 10,000 μm² or larger at every measurement intervals of 0.25 μm by an EBSD method, measured results are analyzed by data analysis software OIM to obtain a CI value in each measurement point, a measurement point in which a CI value is 0.1 or less is removed, a boundary having more than 150 of an orientation difference between neighboring measuring points is assigned as a grain boundary, a coincidence boundary in which a Σ value is 29 or less is defined as a special grain boundary, and the remaining grain boundaries are defined as random grain boundaries, then, with regard to grain boundary triple junctions analyzed by the OIM, $0.20<(NF_{J2}/(1-NF_{J3}))^{0.5}\leq0.45$ is satisfied in a case where a proportion of J3, in which all three grain boundaries constituting a grain boundary triple junction are special grain boundaries, to total grain boundary triple junctions is represented by $NF_{J3}$, and a proportion of J2, in which two grain boundaries constituting a grain boundary triple junction are special grain boundaries and one grain boundary is a random grain boundary, to the total grain boundary triple junctions is represented by $NF_{J2}$. Accordingly, cracks are easily developed along grain boundaries, and it is possible to improve punching formability at the time of press working.

In addition, since the amount of O is 100 mass ppm or less and the amount of S is 50 mass ppm or less, inclusions including Mg oxide or Mg sulfide can be reduced and occurrence of defects during working can be inhibited. Furthermore, consumption of Mg due to reacting Mg with O and S can be prevented and deterioration of mechanical characteristics can be inhibited.

Furthermore, since the amount of H is 10 mass ppm or less, occurrence of blow hole defects in an ingot can be inhibited and occurrence of defects during working can be inhibited.

Furthermore, since the amount of C is 10 mass ppm or less, the cold workability can be ensured and occurrence of defects during working can be inhibited.

In the copper alloy for electronic or electric devices according to an aspect of the present invention, it is preferable that an electrical conductivity is greater than 75% IACS.

In this case, since the electrical conductivity is sufficiently high, it is possible to apply this copper alloy for electronic or electric devices to usage applications in which pure copper is used in the related art.

In addition, in the copper alloy for electronic or electric devices according to an aspect of the present invention, it is preferable that the amount of Mg [Mg] and the amount of P [P] in terms of mass ratio satisfy a relation: $[Mg]/[P] \leq 400$.

In this case, the castability can be reliably improved by specifying the ratio between the amount of Mg that decreases the castability and the amount of P that improves the castability, as described above.

Furthermore, in the copper alloy for electronic or electric devices according to an aspect of the present invention, it is preferable that a 0.2% proof stress measured by performing a tensile test in a direction parallel to a rolling direction is 200 MPa or greater.

In this case, since the 0.2% proof stress measured by performing a tensile test in a direction parallel to a rolling direction is set to 200 MPa or greater, deformation does not easily occur. Accordingly, the copper alloy for electronic or electric devices is particularly suitable as a copper alloy of a component for electronic or electric devices for large current/high voltage, for example, a terminal such as a connector or a press-fit connector, a busbar, or the like.

Furthermore, in the copper alloy for electronic or electric devices according to an aspect of the present invention, it is preferable that a residual stress rate is 75% or greater under conditions of 150° C. for 1,000 hours.

In this case, since the residual stress rate is specified as described above, permanent deformation can be suppressed to the minimum in a case of being used in a high temperature environment, and a decrease in contact pressure of a connector terminal or the like can be inhibited. Therefore, the alloy can be applied as a material of a component for electronic devices to be used in a high temperature environment such as an engine room.

A copper alloy plate or strip material for electronic or electric devices according to an aspect of the present invention includes the above-described copper alloy for electronic or electric devices, and a thickness of the copper alloy plate or strip material is more than 0.5 mm.

According to the copper alloy plate or strip material for electronic or electric devices with such a configuration, since the copper alloy plate or strip material includes the copper alloy for electronic or electric devices, electrical conductivity, strength, bending formability, stress relaxation resistance, and punching formability are excellent. Accordingly, the copper alloy plate or strip material is particularly suitable as a material of a component for electronic or electric devices having an increased thickness, for example, a terminal such as a connector or a press-fit connector, a busbar, or the like.

It is preferable that the copper alloy plate or strip material for electronic or electric devices according to an aspect of the present invention further includes a Sn plating layer or a Ag plating layer on a surface thereof.

In this case, since the surface of the copper alloy plate or strip material has a Sn plating layer or a Ag plating layer, the copper alloy plate or strip material is particularly suitable as a material of components for electronic or electric devices, for example, a terminal such as a connector or a press-fit connector, a busbar, or the like. In an aspect of the present invention, "Sn plating" includes pure Sn plating or Sn alloy plating and the "Ag plating" includes pure Ag plating or Ag alloy plating.

A component for electronic or electric devices according to an aspect of the present invention includes the above-described copper alloy plate or strip material for electronic or electric devices. Examples of the component for electronic or electric devices according to an aspect of the present invention include a terminal such as a connector or a press-fit connector, a busbar, or the like.

Since the component for electronic or electric devices with such a configuration is produced using the above-described copper alloy plate or strip material for electronic or electric devices, excellent characteristics can be exhibited even in a case where the size and the thickness are increased in response to large current usage applications.

A terminal according to an aspect of the present invention includes the above-described copper alloy plate or strip material for electronic or electric devices.

Since the terminal with such a configuration is produced using the above-described copper alloy plate or strip material for electronic or electric devices, excellent characteristics can be exhibited even in a case where the size and the thickness are increased in response to large current usage applications.

A busbar according to an aspect of the present invention includes the above-described copper alloy plate or strip material for electronic or electric devices.

Since the busbar with such a configuration is produced using the above-described copper alloy plate or strip material for electronic or electric devices, excellent characteristics can be exhibited even in a case where the size and the thickness are increased in response to large current usage applications.

Effects of Invention

According to an aspect of the present invention, it is possible to provide a copper alloy for electronic or electric devices which is excellent in electrical conductivity, strength, bending formability, stress relaxation resistance, castability, and punching formability; and a copper alloy plate or strip material for electronic or electric devices, and to provide a component for electronic or electric devices, a terminal, and a busbar which include this copper alloy plate or strip material for electronic or electric devices.

DETAILED DESCRIPTION OF THE INVENTION

Figure 1:
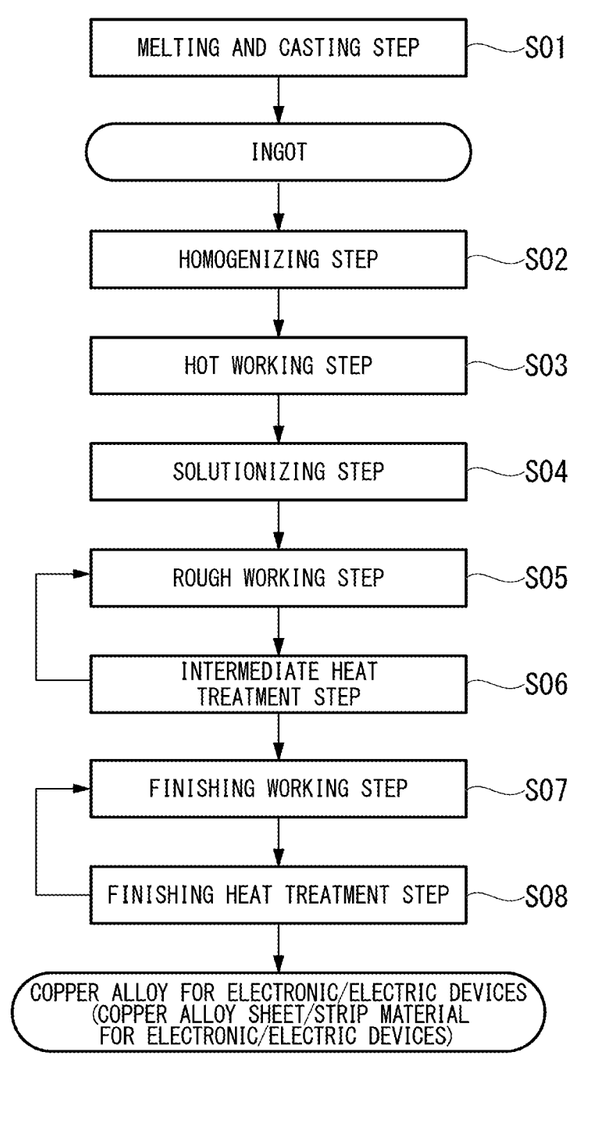
The FIGURE is a flow chart showing a method of producing a copper alloy for electronic or electric devices according to the present embodiment.

Hereinafter, a copper alloy for electronic or electric devices according to an embodiment of the present invention will be described.

The copper alloy for electronic or electric devices according to the present embodiment has a composition including: 0.15 mass % or greater and less than 0.35 mass % of Mg; and 0.0005 mass % or greater and less than 0.01 mass % of P, with a remainder being Cu and unavoidable impurities.

In addition, the amount of Mg [Mg] and the amount of P [P] in terms of mass ratio satisfy the following relation.

$$[Mg]+20\times[P]\leq 0.5$$

Furthermore, in the copper alloy for electronic or electric devices according to the embodiment of the present invention, the amount of H is 10 mass ppm or less, the amount of O is 100 mass ppm or less, the amount of S is 50 mass ppm or less, and the amount of C is 10 mass ppm or less, all of which are the unavoidable impurities.

Furthermore, in the copper alloy for electronic or electric devices according to the embodiment of the present invention, $0.20<(NF_{J2}/(1-NF_{J3}))^{0.5}\leq 0.45$ is satisfied. A surface orthogonal to a rolling width direction is used as an observation surface, and a matrix is measured by an EBSD method over a measurement area of 10,000 μm² or larger at every measurement intervals of 0.25 μm. Next, measured results are analyzed by data analysis software OIM to obtain a CI value in each measurement point, a measurement point in which a CI value is 0.1 or less is removed, and a boundary having more than 15° of an orientation difference between neighboring measuring points is assigned as a grain boundary. A coincidence boundary in which a Σ value is 29 or less is defined as a special grain boundary, and the remaining grain boundaries are defined as random grain boundaries. With regard to grain boundary triple junctions analyzed by the OIM, a proportion of J3, in which all three grain boundaries constituting a grain boundary triple junction are special grain boundaries, to total grain boundary triple junctions is represented by $NF_{J3}$, and a proportion of J2, in which two grain boundaries constituting a grain boundary triple junction are special grain boundaries and one grain boundary is a random grain boundary, to the total grain boundary triple junctions is represented by $NF_{J2}$. These $NF_{J3}$ and $NF_{J2}$ satisfy $0.20<(NF_{J2}/(1-NF_{J3}))^{0.5}\leq 0.45$.

In the present embodiment, the amount of Mg [Mg] and the amount of P [P] in terms of mass ratio preferably have the following relation.

$$[Mg]/[P]\leq 400$$

Furthermore, in the copper alloy for electronic or electric devices according to the present embodiment, an electrical conductivity is preferably greater than 75% IACS.

Furthermore, in the copper alloy for electronic or electric devices according to the present embodiment, a 0.2% proof stress measured by performing a tensile test in a direction parallel to a rolling direction is preferably 200 MPa or greater. In other words, in the present embodiment, the copper alloy for electronic or electric devices is a rolled material, and the 0.2% proof stress measured by performing the tensile test in a direction parallel to the rolling direction in the final step of rolling is specified as described above.

Further, in the copper alloy for electronic or electric devices according to the present embodiment, the residual stress rate is preferably 75% or greater under conditions of 150° C. for 1000 hours.

The reasons for specifying the component composition, crystal structures, and various characteristics as described above will be described.

(Mg: 0.15 Mass % or Greater and Less than 0.35 Mass %)

In a case where Mg is dissolved in a matrix of a copper alloy, Mg is an element having a function of improving strength and stress relaxation resistance while maintaining a high electrical conductivity.

In a case where the amount of Mg is less than 0.15 mass %, there is a concern that the effects are not fully achieved. Furthermore, in a case where the amount of Mg is 0.35 mass % or greater, there is a concern that the electrical conductivity is greatly degraded, the viscosity of a molten copper alloy is increased, and the castability is degraded.

As described above, in the present embodiment, the amount of Mg is set to be 0.15 mass % or greater and less than 0.35 mass %.

In order to further improve strength and stress relaxation resistance, the lower limit of the amount of Mg is set to preferably 0.16 mass % or greater, more preferably 0.17 mass % or greater, and even more preferably 0.18 mass % or greater. Further, in order to reliably inhibit degradation of the electrical conductivity and degradation of the castability, the upper limit of the amount of Mg is set to preferably 0.32 mass % or less, more preferably 0.30 mass % or less, and even more preferably 0.28 mass % or less.

(P: 0.0005 Mass % or Greater and Less than 0.01 Mass %)

P is an element having a function of improving the castability.

In a case where the amount of P is less than 0.0005 mass %, there is a concern that the effects are not fully achieved. Furthermore, in a case where the amount of P is 0.01 mass % or greater, there is a concern that a coarse crystallized material containing Mg and P is generated, and this crystallized material serves as a starting point of fracture and cracking occurs during cold working or bending working.

As described above, in the present embodiment, the amount of P is set to be 0.0005 mass % or greater and less than 0.01 mass %. In order to reliably improve the castability, the lower limit of the amount of P is set to preferably 0.001 mass % or greater and more preferably 0.002 mass % or greater. Further, in order to reliably inhibit generation of a coarse crystallized material, the upper limit of the amount of P is set to preferably less than 0.009 mass %, more preferably less than 0.008 mass %, and even more preferably 0.0075 mass % or less.

([Mg]+20×[P]<0.5)

A crystallized material containing Mg and P is generated due to the coexistence of Mg and P as described above.

When the amount of Mg is represented by [Mg] and the amount of P is represented by [P] in terms of mass ratio, the total amount of Mg and P is large and a crystallized material containing Mg and P coarsens and is distributed at a high density in a case where a value of [Mg]+20×[P] is 0.5 or greater. In this case, there is a concern that cracking may easily occur during cold working or bending working.

Accordingly, in the present embodiment, a value of [Mg]+20×[P] is set to less than 0.5. Further, in order to reliably inhibit coarsening and densification of the crystallized material and to inhibit occurrence of cracking during the cold working and the bending working, a value of [Mg]+20×[P] is set to preferably less than 0.48 and more preferably less than 0.46.

([Mg]/[P]≤400)

Since Mg is an element having a function of increasing the viscosity of the molten copper alloy and decreasing the castability, in the present embodiment, it is preferable to optimize the ratio between the amount of Mg and the amount of P in order to more reliably improve the castability.

When the amount of Mg is represented by [Mg] and the amount of P is represented by [P] in terms of mass ratio, by setting a value of [Mg]/[P] to 400 or less, the ratio of amounts of Mg and P is optimized; and thereby, an effect of improving castability due to the addition of P can be reliably obtained.

As described above, in the present embodiment, a value of [Mg]/[P] is preferably set to 400 or less to more in order to reliably improve castability. In order to further improve the castability, a value of [Mg]/[P] is set to more preferably 350 or less and even more preferably 300 or less.

Further, in a case where a value of [Mg]/[P] is extremely small, Mg is consumed as a crystallized material; and thereby, there is a concern that the effect due to solid solution of Mg may not be obtained. In order to inhibit generation of a crystallized material containing Mg and P and to reliably improve proof stress and stress relaxation resistance due to solid solution of Mg, the lower limit of a value of [Mg]/[P] is set to preferably greater than 20 and more preferably greater than 25.

(Unavoidable Impurities)

Examples of unavoidable impurities include Ag, B, Ca, Sr, Ba, Sc, Y, rare earth elements, Ti, Zr, Hf, V, Nb, Ta, Cr, Mo, W, Mn, Re, Fe, Ru, Os, Co, Se, Te, Rh, Ir, Ni, Pd, Pt, Au, Zn, Cd, Hg, Al, Ga, In, Ge, Sn, As, Sb, Tl, Pb, Bi, Be, N, C, Si, Li, H, O, S, and the like. Because these unavoidable impurities have a function of decreasing electrical conductivity, it is preferable to reduce the amount of the unavoidable impurities.

Furthermore, from the viewpoint that Ag, Zn, and Sn are easily mixed into copper to decrease electrical conductivity, it is preferable that the total amount of Ag, Zn, and Sn is set to less than 500 mass ppm.

Furthermore, from the viewpoint that Si, Cr, Ti, Zr, Fe, and Co greatly decrease electrical conductivity and bending formability deteriorates due to the formation of inclusions, it is preferable that the total amount of these elements (Si, Cr, Ti, Zr, Fe, and Co) is set to less than 500 mass ppm.

(H: 10 Mass Ppm or Less)

H is an element that becomes water vapor by being combined with O during casting and causes blow hole defects in an ingot. The blow hole defects are causes of cracking during casting, and are causes of defects such as swelling and peeling during rolling. It is known that the strength and the resistance to stress corrosion cracking deteriorate because the defects such as cracking, swelling, and peeling lead to stress concentration and cause a starting point of fracture. In a case where the amount of H is greater than 10 mass ppm, the above-described blow hole defects easily occur.

Accordingly, in the present embodiment, the amount of H is set to 10 mass ppm or less. Furthermore, in order to further inhibit occurrence of the blow hole defects, the amount of H is set to preferably 4 mass ppm or less, more preferably 3 mass ppm or less, and even more preferably 2 mass ppm or less.

(O: 100 Mass Ppm or Less)

O is an element that reacts with each component element in a copper alloy to form oxides. Since these oxides serve as a starting point of fracture, the cold workability is degraded and the bending formability also deteriorates. Further, in a case where the amount of O is greater than 100 mass ppm, Mg is consumed due to the reaction between O and Mg; and thereby, there is a concern that the amount of Mg dissolved in a matrix of Cu is decreased and the mechanical characteristics deteriorate.

Accordingly, in the present embodiment, the amount of O is set to 100 mass ppm or less. In the range described above, the amount of O is particularly preferably 50 mass ppm or less and more preferably 20 mass ppm or less.

(S: 50 Mass Ppm or Less)

S is an element that is present in a grain boundary in the form of an intermetallic compound or a complex sulfide. The intermetallic compound or the complex sulfide present in the grain boundary causes intergranular cracks during hot working to become causes of working cracks. Further, since the intermetallic compound or the complex sulfide serves as a starting point of fracture, the cold workability or bending formability deteriorates. Further, since Mg is consumed due to the reaction between S and Mg, there is a concern that the amount of Mg dissolved in a matrix of Cu is decreased and the mechanical characteristics deteriorate.

Accordingly, in the present embodiment, the amount of S is set to 50 mass ppm or less. In the range described above, the amount of S is particularly preferably 40 mass ppm or less and more preferably 30 mass ppm or less.

(C: 10 Mass Ppm or Less)

C is an element that is used to coat the surface of molten metal during melting and casting for the purpose of deoxidizing the molten metal and may be unavoidably mixed. In a case where the amount of C is greater than 10 mass ppm, the amount of C mixed during the casting is increased. The element C or a complex carbide and segregation of a solid solution of C deteriorate the cold workability.

Accordingly, in the present embodiment, the amount of C is set to 10 mass ppm or less. In the range described above, the amount of C is particularly preferably 5 mass ppm or less and more preferably 1 mass ppm or less.

(Proportion of Grain Boundary Triple Junction)

The punching formability at the time of press working becomes more excellent as a burr height at breaking becomes smaller. The burr height tends to increase as the thickness of a material to be pressed increases.

In order to reduce a burr height at the time of press working, it is sufficient that breaking occurs quickly along a grain boundary at the time of press working. When a network of random grain boundaries becomes longer, breaking along grain boundaries are more likely to occur. In order to increase a network length of random grain boundaries, it is important to control a proportion of J3 in which all of three grain boundaries constituting a grain boundary triple junction are special grain boundaries or a proportion of J2 in which two grain boundaries among three grain boundaries are special grain boundaries, and the special grain boundary is a boundary in which a Σ value is 29 or less.

For this reason, in the present embodiment, $0.20 < (NF_{J2}/(1-NF_{J3}))^{0.5} \leq 0.45$ is satisfied.

A surface orthogonal to a rolling width direction is used as an observation surface, and a matrix is measured by an EBSD method over a measurement area of 10,000 μm² or larger at every measurement intervals of 0.25 μm. Next, measured results are analyzed by data analysis software OIM to obtain a CI value in each measurement point, a measurement point in which a CI value is 0.1 or less is removed, and a boundary having more than 15° of an orientation difference between neighboring measuring points is assigned as a grain boundary. A coincidence boundary in which a Σ value is 29 or less is defined as a special grain boundary, and the remaining grain boundaries are defined as random grain boundaries. With regard to grain boundary triple junctions analyzed by the OIM, a proportion of J3, in which all three grain boundaries constituting a grain boundary triple junction are special grain boundaries, to total grain boundary triple junctions is represented by $NF_{J3}$, and a proportion of J2, in which two grain boundaries constituting a grain boundary triple junction are special grain boundaries and one grain boundary is a random grain boundary, to the total grain boundary triple junctions is represented by $NF_{J2}$. These $NF_{J3}$ and $NF_{J2}$ satisfy $0.20 < (NF_{J2}/(1-NF_{J3}))^{0.5} \leq 0.45$.

In a case where a value of $(NF_{J2}/(1-NF_{J3}))^{0.5}$ exceeds 0.45, a network length of random grain boundaries is relatively short, and a network length of special grain boundaries is long. For this reason, a burr height at the time of press working becomes high. On the other hand, in a case where a value of $(NF_{J2}/(1-NF_{J3}))^{0.5}$ is 0.20 or less, a material substantially has a deformed structure; and thereby, bending formability is reduced. For this reason, in the present embodiment, a value of $(NF_{J2}/(1-NF_{J3}))^{0.5}$ is set to be in a range of more than 0.20 and equal to or less than 0.45.

The lower limit of a value of $(NF_{J2}/(1-NF_{J3}))^{0.5}$ is preferably 0.21 or more, more preferably 0.22 or more, and even more preferably 0.23 or more. Meanwhile, the upper limit of a value of $(NF_{J2}/(1-NF_{J3}))^{0.5}$ is preferably 0.40 or less and more preferably 0.35 or less.

(Electrical Conductivity: Greater than 75% IACS)

In the copper alloy for electronic or electric devices according to the present embodiment, by setting the electrical conductivity to greater than 75% IACS, the alloy can be satisfactorily used as a component for electronic or electric devices, for example, a terminal such as a connector or a press-fit connector, a busbar, or the like.

In addition, the electrical conductivity is set to preferably greater than 76% IACS, more preferably greater than 77% IACS, and even more preferably greater than 78% IACS.

(0.2% Proof Stress: 200 MPa or Greater)

In the copper alloy for electronic or electric devices according to the present embodiment, a 0.2% proof stress is set to 200 MPa or more; and thereby, deformation does not easily occur. Accordingly, the copper alloy for electronic or electric devices is particularly suitable as a material of a component for electronic or electric devices for large current/high voltage, for example, a terminal such as a connector or a press-fit connector, a busbar, or the like. Further, in the present embodiment, the 0.2% proof stress measured by performing the tensile test in a direction parallel to the rolling direction is set to 200 MPa or greater.

The 0.2% proof stress described above is set to preferably 225 MPa or greater and more preferably 250 MPa or greater.

In addition, in order to achieve high productivity without forming coil curl when a copper alloy is formed into a strip shape with a thickness exceeding 3 mm and the strip is wound in a coil, the upper limit of the 0.2% proof stress is preferably 450 MPa or less, more preferably 400 MPa or less, and even more preferably 375 MPa or less.

(Residual Stress Rate: 75% or Greater)

In the copper alloy for electronic or electric devices according to the present embodiment, the residual stress rate is set to 75% or greater under conditions of 150° C. for 1000 hours as described above.

In a case where the residual stress rate under the above-described conditions is high, permanent deformation can be suppressed to the minimum even in a case of being used in a high temperature environment, and a decrease in contact pressure can be inhibited. Therefore, the copper alloy for electronic or electric devices according to the present embodiment can be applied as a terminal to be used in a high temperature environment such as the periphery of an engine room of a vehicle. In the present embodiment, the residual stress rate measured by performing a stress relaxation test in a direction parallel to the rolling direction is set to 75% or greater under conditions of 150° C. for 1000 hours.

In addition, the residual stress rate is set to preferably 77% or greater under conditions of 150° C. for 1000 hours and more preferably 80% or greater under conditions of 150° C. for 1000 hours.

Next, a method of producing the copper alloy for electronic or electric devices according to the present embodiment having these configurations will be described with reference to the flow chart of the FIGURE.

(Melting and Casting Step S01)

First, the above-described elements are added to molten copper obtained by melting the copper raw material to adjust components; and thereby, a molten copper alloy is produced. Further, a single element, a base alloy, or the like can be used for addition of various elements. In addition, raw materials containing the above-described elements may be melt together with the copper raw material. Further, a recycled material or a scrap material of the present alloy (the copper alloy of the present embodiment) may be used. As the molten copper, so-called 4NCu having a purity of 99.99 mass % or greater or so-called 5NCu having a purity of 99.999 mass % or greater is preferably used. Particularly, in the present embodiment, since the amounts of H, O, S, and C are specified as described above, raw materials with small amounts of these elements are selected and used. Specifically, it is preferable to use a raw material having an amount of H of 0.5 mass ppm or less, an amount of O of 2.0 mass ppm or less, an amount of S of 5.0 mass ppm or less, and an amount of C of 1.0 mass ppm or less.

In the melting and casting step S01, in order to inhibit oxidation of Mg and reduce the hydrogen concentration, melting is performed in an inert gas atmosphere (for example, Ar gas) in which the vapor pressure of $H_2O$ is low and a retention time during melting is set to the minimum.

Next, the molten copper alloy in which the components have been adjusted is poured into a mold to produce an ingot. In consideration of mass production, it is preferable to use a continuous casting method or a semi-continuous casting method.

Since a crystallized material containing Mg and P is formed at the time of solidification of molten metal, the size of the crystallized material can be set to be finer by increasing the solidification rate. Accordingly, the cooling rate at the time of casting is set to preferably 0.1° C./sec or greater, more preferably 0.5° C./sec or greater, and most preferably 1° C./sec or greater.

(Homogenizing Step S02)

Next, a heat treatment is performed for homogenization of the obtained ingot. In the interior of the ingot, there may be portions in which Mg is segregated in a process of solidification, and intermetallic compounds and the like which contain Cu and Mg as main components, and the intermetallic compounds are generated by further segregation of Mg and an increase in a Mg concentration. Therefore, a heat treatment of heating the ingot to a temperature of 400° C. to 900° C. is performed for the purpose of eliminating or reducing the segregation and the intermetallic compounds. Thereby, Mg is homogeneously diffused or dissolved in a matrix in the ingot. This homogenizing step S02 is preferably performed in a non-oxidizing or reducing atmosphere.

In a case where the heating temperature is lower than 400° C., the solutionization becomes incomplete, and thus a large amount of intermetallic compounds containing Cu and Mg as the main components may remain in the matrix. Further, in a case where the heating temperature is higher than 900° C., a part of the copper material becomes a liquid phase, and thus the structure or the surface state may become non-uniform. Therefore, the heating temperature is set to be in a range of 400° C. to 900° C. The lower limit of the heating temperature is preferably 500° C. or higher and more preferably 600° C. or higher. The upper limit of the heating temperature is 850° C. or lower and more preferably 800° C. or lower.

(Hot Working Step S03)

Since segregation of Mg is likely to occur at grain boundaries, it becomes difficult to control a grain boundary triple junction if a portion of segregation of Mg is present.

Accordingly, in order to eliminate segregation of Mg and to make a structure uniform completely, hot working is performed after the above-described homogenizing step S02.

The total working rate of the hot working is preferably 50% or more, more preferably 60% or more, and even more preferably 70% or more.

In this case, the working method is not particularly limited, and examples of the method which can be employed include rolling, drawing, extruding, groove rolling, forging, and pressing. In addition, the hot working temperature is preferably set to be in a range of 400° C. to 900° C.

(Solutionizing Step S04)

A solutionizing heat treatment is performed after the above-mentioned hot working step S03 to completely eliminate segregation of Mg at grain boundaries. Conditions for the solutionizing step S04 are preferably conditions in which a heating temperature is within a range of 500° C. to 900° C., and a retention time at the heating temperature is within a range of 1 second to 10 hours. This solutionizing step S04 may also serve as the above-mentioned hot working step S03. In this case, the finish temperature of the hot working is set to be higher than 500° C., and after the hot working is completed, the temperature is retained at 500° C. or higher for 10 seconds or longer.

(Rough Working Step S05)

In order to work the alloy into a predetermined shape, rough working is performed. In this rough working step S05, warm working at a temperature of 100° C. to 350° C. is performed once or more. By performing the warm working at a temperature of 100° C. to 350° C., it is possible to increase a micro recrystallization area during working, and a structure is randomized and the total number of random grain boundaries can be increased during recrystallization in an intermediate heat treatment step S06 which is the subsequent step. Thereby, it is possible to set a value of $NF_{J2}/(1-NF_{J3}))^{0.5}$ within a desired range. In a case where the warm working is performed once, it is performed in the final step of the rough working step S05. Furthermore, instead of the warm working, heat generated by working which is obtained by increasing a working rate per working step may be used. In this case, for example, rolling is preferably performed at a working rate per pass of 15% or more, preferably 20% or more, and more preferably 30% or more. The number of times of the warm working is preferably two or more times. The lower limit of a warm working temperature is preferably 150° C. or higher and more preferably higher than 200° C. In addition, the upper limit is set to 350° C. or lower so that grain growth after recrystallization does not greatly occur, but it is set to preferably 325° C. or lower, and more preferably lower than 300° C.

(Intermediate Heat Treatment Step S06)

After the rough working step S05, a heat treatment is performed for the purpose of obtaining recrystallization structure for increasing a ratio in terms of number of random grain boundaries and for the purpose of softening for improving formability. The method of the heat treatment is not particularly limited, and the heat treatment is preferably performed in a non-oxidizing atmosphere or a reducing atmosphere in a holding temperature range of 400° C. to 900° C. for a retention time of 10 seconds to 10 hours. Further, the cooling method after the heating is not particularly limited, but it is preferable that a method in which the cooling rate is 200° C./min or greater such as water quenching or the like is employed.

Further, the rough working step S05 and the intermediate heat treatment step S06 may be repeatedly performed.

(Finishing Working Step S07)

In order to subject the copper material after the intermediate heat treatment step S06 to working to be in a predetermined shape, finishing working is performed. In the finishing working step S07, warm working at a temperature of 50° C. or higher and lower than 300° C. is performed at least once so as to immediately rearrange dislocations which are introduced during the working, to set a value of $NF_{J2}/(1-NF_{J3}))^{0.5}$ to be in a desired range, and to further improve stress relaxation resistance. By performing the warm working at a temperature of 50° C. or higher and lower than 300° C., dislocations introduced during the working are rearranged; and thereby, stress relaxation resistance is improved. In the finishing working step S07, a working method and a working rate vary depending on final shapes, but in a case of forming a strip or a plate, rolling may be performed. In addition, steps other than one or more times of warm working steps may be general cold working steps. Instead of (in place of) warm working at a temperature of 50° C. or higher and lower than 300° C., a working rate per working step may be increased, and heat generated by the working may be used. In this case, for example, in rolling, the working rate per pass may be 10% or more.

In addition, the working rate is appropriately selected such that the shape of the copper material approximates the final shape, but it is preferable that the working rate is set to 20% or greater for the purpose of improving the strength due to work hardening. In addition, in a case of further improving the strength, a working rate is more preferably set to 30% or greater, and a working rate is even more preferably set to 40% or greater. The working rate is still more preferably 50% or greater.

(Finishing Heat Treatment Step S08)

Next, in order to improve stress relaxation resistance, to carry out hardening due to low-temperature annealing or to remove residual strains, the plastically-worked material obtained from the finishing working step S07 is subjected to a finishing heat treatment. A heat treatment temperature is preferably within a range of 100° C. to 800° C. In the finishing heat treatment step S08, heat treatment conditions (temperature, time, cooling rate) need to be set to suppress the ratio in terms of number of special grain boundaries at a grain boundary triple junction due to recrystallization. For example, in a case where the temperature is within a range of 200° C. to 300° C., a retention time is preferably 10 seconds to 10 hours. This heat treatment is preferably performed in a non-oxidizing or reducing atmosphere. A method of performing the heat treatment is not particularly limited, but it is preferable that the heat treatment is performed using a continuous annealing furnace at a high temperature for a short period of time from the viewpoint of the effects of reducing the production cost.

Further, the finishing working step S07 and the finishing heat treatment step S08 may be repeatedly performed.

In the above-described manner, the copper alloy for electronic or electric devices (the copper alloy plate or strip material for electronic or electric devices) according to the present embodiment is produced. The thickness of the copper alloy plate or strip material for electronic or electric devices is not particularly limited, but in a case where the thickness exceeds 5.0 mm, when the copper alloy plate or strip material for electronic or electric devices is formed into a connector, a terminal, or busbar by press working, the load on a pressing machine increases greatly, and productivity per unit time decreases; and thereby, costs increase. For this reason, in the present embodiment, a thickness of the copper alloy plate or strip material for electronic or electric devices is preferably more than 0.5 mm and equal to or less than 5.0 mm. The lower limit of the thickness of the copper alloy plate or strip material for electronic or electric devices is preferably more than 1.0 mm, more preferably 1.5 mm or more, even more preferably 2.0 mm or more, and still more preferably more than 3.0 mm.

The copper alloy plate or strip material for electronic or electric devices according to the present embodiment may be used as a component for electronic or electric devices as it is, but a Sn plating layer or a Ag plating layer having a film thickness of about 0.1 to 100 μm may be formed on one plate surface or both plate surfaces. The copper alloy for electronic or electric devices (the copper alloy plate or strip material for electronic or electric devices) according to the present embodiment is used as a material and is subjected to punching, bending working or the like; and thereby, a component for electronic or electric devices, for example, a terminal such as a connector or a press-fit connector, or a busbar is formed.

According to the copper alloy for electronic or electric devices of the present embodiment with the above-described configuration, the amount of Mg is 0.15 mass % or greater and less than 0.35 mass %. Therefore, by dissolving Mg in a matrix of copper, strength and stress relaxation resistance can be improved without greatly degrading the electrical conductivity.

Furthermore, since the amount of P is 0.0005 mass % or greater and less than 0.01 mass %, the castability can be improved.

Furthermore, since the amount of Mg [Mg] and the amount of P [P] in terms of mass ratio satisfy a relation of [Mg]+20×[P]≤0.5, generation of a coarse crystallized material containing Mg and P can be inhibited and degradation of cold workability and bending formability can be inhibited.

In addition, since the amount of O is 100 mass ppm or less and the amount of S is 50 mass ppm or less, inclusions including Mg oxide and Mg sulfide can be reduced.

Furthermore, since the amount of H is 10 mass ppm or less, occurrence of blow hole defects in an ingot can be inhibited.

Furthermore, since the amount of C is 10 mass ppm or less, the cold workability can be ensured.

As described above, occurrence of defects at the time of working can be inhibited, and the cold workability and the bending formability can be remarkably improved.

In addition, a surface orthogonal to a rolling width direction is used as an observation surface, a matrix is measured by an EBSD method over a measurement area of 10,000 μm$^2$ or larger at every measurement intervals of 0.25 μm. Next, measured results are analyzed by data analysis software OIM to obtain a CI value in each measurement point, a measurement point in which a CI value is 0.1 or less is removed, and a boundary having more than 15 of an orientation difference between neighboring measuring points is assigned as a grain boundary. A coincidence boundary in which a Σ value is 29 or less is defined as a special grain boundary, and the remaining grain boundaries are defined as random grain boundaries. With regard to grain boundary triple junctions analyzed by the OIM, a proportion of J3, in which all three grain boundaries constituting a grain boundary triple junction are special grain boundaries, to total grain boundary triple junctions is represented by $NF_{J3}$, and a proportion of J2, in which two grain boundaries constituting a grain boundary triple junction are special grain boundaries and one grain boundary is a random grain boundary, to the total grain boundary triple junctions is represented by $NF_{J2}$. Since these $NF_{J3}$ and $NF_{J2}$ satisfy $0.20<(NF_{J2}/(1-NF_{J3}))^{0.5}\leq 0.45$, a network length of random grain boundaries is long, and breaking along grain boundaries occurs quickly during press working. Therefore, press punching formability is excellent.

In addition, in the present embodiment, since an amount of Mg [Mg] and an amount of P [P] in terms of mass ratio preferably satisfy a relation of [Mg]/[P]≤400, the ratio between the amount of Mg that degrades the castability and the amount of P that improves the castability is optimized, and castability can be reliably improved by effects due to addition of P.

Further, in the copper alloy for electronic or electric devices according to the present embodiment, the 0.2% proof stress measured by performing a tensile test in a direction parallel to a rolling direction is 200 MPa or greater, and the electrical conductivity is greater than 75% IACS. For this reason, the copper alloy for electronic or electric devices of the present embodiment is suitable for increasing the thickness of a component for electronic or electric devices in accordance with high voltage and large current, and it is particularly suitable as a material for a component for electronic or electric devices, for example, a terminal such as a connector or a press-fit connector, a busbar, or the like.

Furthermore, in the copper alloy for electronic or electric devices according to the present embodiment, the residual stress rate is 75% or greater under conditions of 150° C. for 1000 hours. For this reason, permanent deformation can be suppressed to the minimum even in a case of being used in a high temperature environment, and for example, a decrease in contact pressure of connector terminals and the like can be inhibited. Accordingly, the copper alloy for electronic or electric devices of the present embodiment can be applied as a material of a component for electronic devices to be used in a high temperature environment such as an engine room.

Furthermore, the copper alloy plate or strip material for electronic or electric devices according to the present embodiment includes the above-described copper alloy for electronic or electric devices. Accordingly, by subjecting the copper alloy plate or strip material for electronic or electric devices to bending working or the like, it is possible to produce a component for electronic or electric devices, for example, a terminal such as a connector or a press-fit connector, a busbar, or the like.

In a case where a Sn plating layer or a Ag plating layer is formed on a surface, the copper alloy plate or strip material for electronic or electric devices of the present embodiment can be particularly applied as a material of a component for electronic or electric devices, for example, a terminal such as a connector or a press-fit connector, a busbar, or the like.

Further, since the component for electronic or electric devices (a terminal such as a connector or a press-fit connector, a busbar, or the like) of the present embodiment includes the above-described copper alloy for electronic or electric devices, excellent characteristics can be exhibited even in a case where the size and the thickness are increased.

Hereinbefore, the copper alloy for electronic or electric devices, the copper alloy plate or strip material for electronic or electric devices, and the component for electronic or electric devices (such as a terminal or a busbar) according to the embodiment of the present invention have been described, but the present invention is not limited thereto and can be appropriately changed within the range not departing from the technical features of the present invention.

For example, in the above-described embodiment, the example of the method of producing the copper alloy for electronic or electric devices has been described, but the method of producing the copper alloy for electronic or electric devices is not limited to the description of the embodiment, and the copper alloy for electronic or electric devices may be produced by appropriately selecting a production method of the related art.

EXAMPLES

Hereinafter, results of a verification test conducted to verify the effects of the present invention will be described.

A selected copper in which the amount of H was 0.1 mass ppm or less, the amount of O was 1.0 mass ppm or less, the amount of S was 1.0 mass ppm or less, the amount of C was 0.3 mass ppm or less, and a Cu purity was 99.99 mass % or greater was prepared, and in addition to this copper, a Cu—Mg alloy having a purity of 99.9 mass % or more was used as a raw material.

A high-purity alumina crucible was charged with the copper, and the copper was melted in a high-purity Ar gas (a dew point was −80° C. or lower) atmosphere using a high-frequency induction melting furnace. Various elements were added, and in a case where H and O were introduced into the molten copper alloy, an Ar—N$_2$—H$_2$ and Ar—O$_2$ mixed gas atmospheres were prepared as the atmosphere at the time of melting using high-purity Ar gas (a dew point was −80° C. or lower), high-purity N$_2$ gas (a dew point was −80° C. or lower), high-purity O$_2$ gas (a dew point was −80° C. or lower), and high-purity H$_2$ gas (a dew point was −80° C. or lower). In a case where C was introduced thereinto, the surface of the molten metal during melting was coated with C particles so that C was brought into contact with the molten metal. Further, in a case where S was introduced thereinto, S was directly added thereto. In this manner, the molten alloy with the component composition listed in Table 1 was produced and poured into a mold to produce an ingot.

In Invention Examples 1 and 11, a heat insulating material (isowool) mold was used, and in invention examples and comparative examples other than Invention Examples 1 and 11, a carbon mold was used. Further, the size of an ingot was set to have a thickness of approximately 100 mm, a width of approximately 150 mm, and a length of approximately 100 mm.

The vicinity of a casting surface of the ingot was chamfered. Thereafter, heating was performed for 4 hours in an Ar gas atmosphere using an electric furnace under temperature conditions shown in Table 2 to perform a homogenizing treatment.

The ingot after the homogenization heat treatment was subjected to hot rolling to obtain a thickness of about 50 mm. Thereafter, the ingot was cut and heated for 4 hours using an electric furnace under the conditions shown in Table 2 to perform a solutionizing treatment.

After the solutionizing treatment, a rolling roll was heated to 300° C., and rough rolling was performed at a rolling reduction rate shown in Table 2.

After the rough rolling, an intermediate heat treatment was performed using an electric furnace and a salt bath furnace under the temperature conditions shown in Table 2 such that an average crystal grain size became approximately between 5 μm and 15 μm. The heat treatment using an electric furnace was performed in an Ar atmosphere.

The average crystal grain size after the intermediate heat treatment was measured as follows. A surface orthogonal to a rolling width direction, that is, a transverse direction (TD) surface was used as an observation surface, and mirror polishing and etching were performed. Next, images (photographs) were taken with an optical microscope such that the rolling direction was horizontal to the photograph, and the images were observed in a 1000-fold visual field (about 300×200 μm$^2$). Then, according to a cutting method of JIS H 0501, five lines having predetermined lengths were drawn at predetermined intervals in each vertical and horizontal directions of the photographs. The number of crystal grains which were completely cut were counted, and the average value of the cut length was calculated as the average crystal grain size.

The copper material which had been subjected to the heat treatment was appropriately cut to have a shape suitable as the final shape, and was subjected to surface grinding to remove an oxide film. Thereafter, a rolling roll was heated to 200° C., and a copper material having a thickness before rolling shown in Table 2 was subjected to finish rolling (finishing working). As described above, in Invention Examples 1 to 10 and Comparative Examples 1, 2, 4, 6, 7, and 8, thin plates having a thickness of 3.5 mm and a width of about 150 mm were produced. In addition, in Invention Examples 11 to 20, thin plates having a thickness of 1.5 mm and a width of approximately 150 mm were produced. Then, after the finish rolling (finishing working), a finishing heat treatment was performed using an electric furnace or a salt bath furnace under the conditions shown in Table 2. Thereafter, water quenching was performed to produce thin plates for characteristic evaluation.

Then, the following items were evaluated. The evaluation results are shown in Table 3.

(Castability)

The presence of surface roughening during the above-described casting was observed for evaluation of the castability. A case where surface roughening was hardly visually found was evaluated as "A" (excellent), a case where surface roughening with a depth of less than 1 mm was generated was evaluated as "B" (good), and a case where surface roughening with a depth of 1 mm or greater and less than 2 mm was generated was evaluated as "C" (fair). Further, a case where surface roughening with a depth of 2 mm or greater was generated was evaluated as "D" (bad), and the evaluation was stopped in this case.

The depth of the surface roughening indicates the depth of surface roughening formed toward the central portion from an edge portion of an ingot.

(Proportion of Grain Boundary Triple Junction)

A cross section orthogonal to a rolling width direction, that is, a transverse direction (TD) surface was used as an observation surface, crystal grain boundaries (special grain boundaries and random grain boundaries) and grain boundary triple junctions were measured as follows using an EBSD measuring apparatus and OIM analysis software. Mechanical polishing was performed using water-resistant abrasive paper and diamond abrasive grains. Next, finish polishing was performed using a colloidal silica solution. Then, using an EBSD measuring apparatus (Quanta FEG 450 manufactured by FEI, OIM Data Collection manufactured by EDAX/TSL (current AMETEK)), and analysis software (OIM Data Analysis ver. 7.2 manufactured by EDAX/TSL (current AMETEK)), a matrix was measured with an electron beam acceleration voltage of 20 kV over a measurement area of 10,000 µm² or larger at every measurement intervals of 0.25 µm. Measurement points in which a CI value was 0.1 or less were removed, and an orientation difference of each crystal grain was analyzed. A boundary having more than 15o of an orientation difference between neighboring measuring points was assigned as a grain boundary. In addition, for three grain boundaries constituting each grain boundary triple junction, a special grain boundary and a random grain boundary were identified using a value of CSL sigma value calculated in neighboring grid point. Coincidence boundaries in which a Σ value was more than 29 were defined as random grain boundaries.

(Mechanical Characteristics)

A No. 13B test piece specified in JIS Z 2241 was collected from each strip material for characteristic evaluation and the 0.2% proof stress was measured according to the offset method in JIS Z 2241. The test piece was collected in a direction parallel to the rolling direction.

(Electrical Conductivity)

A test piece having a width of 10 mm and a length of 150 mm was collected from each strip material for characteristic evaluation and the electric resistance was measured according to a four-terminal method. Further, the dimension of each test piece was measured using a micrometer and the volume of the test piece was calculated. The electrical conductivity was calculated from the measured electric resistance and volume. The test piece was collected such that the longitudinal direction thereof was parallel to the rolling direction of each strip material for characteristic evaluation.

(Bending Formability)

Bending working was performed in conformity with a 4 test method in JCBA-T307: 2007 of Japan Copper and Brass Association Technical Standards. In Invention Examples 1 to 10 and Comparative Examples 2, 6, 7, and 8, a plurality of test pieces having a width of 3.5 mm and a length of 30 mm were cut and collected from each thin plate for characteristic evaluation, and the cut surfaces were polished. Next, a W bending test was performed using a W-shaped jig having a bending angle of 90 degrees and a bending radius of 1 mm (R/t=0.3) such that a bending axis was in a direction orthogonal to a rolling direction. Meanwhile in Invention Examples 11 to 20, a plurality of test pieces having a width of 10 mm and a length of 30 mm were cut and collected from each thin plate for characteristic evaluation, and the cut surfaces were polished. Next, a W bending test was performed using a W-shaped jig having a bending angle of 90 degrees and a bending radius of 0.4 mm (R/t=0.3) such that a bending axis was in a direction orthogonal to a rolling direction.

The outer peripheral portion of a bent portion was visually observed, and a case where cracks were found was evaluated as "D" (bad), a case where large wrinkles were observed was evaluated as "B" (good), and a case where breakage, fine cracks, or large wrinkles were not found was evaluated as "A" (excellent). The evaluations "A" and "B" were determined to have acceptable bending formability. The evaluation results are shown in Table 3.

(Punching Formability)

A plurality of circular holes (φ8 mm) were punched out from the strip material for characteristic evaluation with a die, a burr height was measured, and punching formability was evaluated.

The die clearance was about 3% with respect to a plate thickness, and punching was performed at a punching speed of 50 spm (stroke per minute). The cut surface on the punching side was observed, the burr height was measured at 10 points, and the ratio of the burr height to the plate thickness was determined.

A case where the highest value of the burr height was 2.5% or less with respect to the plate thickness was evaluated as "A" (excellent). A case where the highest value of the burr height was more than 2.5% and equal to or less than 3.0% with respect to the plate thickness was evaluated as "B" (good). A case where the highest value of the burr height was more than 3.0% with respect to the plate thickness was evaluated as "D" (bad).

(Stress Relaxation Resistance)

A test of stress relaxation resistance was carried out by applying a load by a method in conformity with a cantilever screw method of JCBA-T309: 2004 of Japan Copper and Brass Association Technical Standards and measuring the residual stress rate after being retained at a temperature of 150° C. for 1000 hours.

According to the test method, a test piece (width of 10 mm) was collected in a direction parallel to the rolling direction from each strip material for characteristic evaluation, the initial deflection displacement was set to 2 mm and the span length was adjusted such that the maximum surface stress of each test piece was 80% of the proof stress. The maximum surface stress was determined according to the following equation.

$$\text{Maximum surface stress (MPa)} = 1.5 E t \delta_0 / L_s^2$$

Where each symbol in the equation represents the following items.

E: Young's modulus (MPa)

t: Thickness of the sample shown in Tables (t=1.5 mm or 3.5 mm)

$\delta_0$: Initial deflection displacement (2 mm)

$L_s$: Span length (mm)

The residual stress rate was measured based on the bending habit after being retained at a temperature of 150° C. for 1000 hours and stress relaxation resistance was evaluated. The residual stress rate was calculated using the following equation.

$$\text{Residual stress rate}(\%) = (1 - \delta_t/\delta_0) \times 100$$

Where each symbol in the equation represents the following items.

$\delta_t$: (Permanent deflection displacement (mm) after being retained at 150° C. for 1000 hours)−(permanent deflection displacement (mm) after being retained at room temperature for 24 hours)

$\delta_0$: Initial deflection displacement (mm)

TABLE 1

| | | Mg | P | Unavoidable impurities (mass ppm) | | | | | [Mg] + 20 × [P] | [Mg]/[P] |
|---|---|---|---|---|---|---|---|---|---|---|
| | | mass % | mass % | H | O | S | C | Cu | | |
| Invention Example | 1 | 0.16 | 0.0096 | 0.6 | 2 | 5 | 0.4 | Remainder | 0.35 | 17 |
| | 2 | 0.19 | 0.0019 | 0.9 | 4 | 3 | 0.6 | Remainder | 0.23 | 100 |
| | 3 | 0.16 | 0.0078 | 1.2 | 2 | 2 | 0.5 | Remainder | 0.32 | 21 |
| | 4 | 0.23 | 0.0072 | 0.3 | 4 | 3 | 0.5 | Remainder | 0.37 | 32 |
| | 5 | 0.24 | 0.0021 | 0.4 | 3 | 5 | 0.6 | Remainder | 0.28 | 114 |
| | 6 | 0.24 | 0.0011 | 0.2 | 5 | 2 | 0.7 | Remainder | 0.26 | 218 |
| | 7 | 0.26 | 0.0056 | 0.8 | 3 | 34 | 0.4 | Remainder | 0.37 | 46 |
| | 8 | 0.25 | 0.0071 | 0.1 | 10 | 2 | 0.4 | Remainder | 0.39 | 35 |
| | 9 | 0.26 | 0.0099 | 0.4 | 5 | 5 | 3.2 | Remainder | 0.46 | 26 |
| | 10 | 0.31 | 0.0084 | 2.1 | 1 | 4 | 0.7 | Remainder | 0.48 | 37 |
| | 11 | 0.16 | 0.0096 | 0.6 | 2 | 5 | 0.4 | Remainder | 0.35 | 17 |
| | 12 | 0.19 | 0.0019 | 0.9 | 4 | 3 | 0.6 | Remainder | 0.23 | 100 |
| | 13 | 0.16 | 0.0078 | 1.2 | 2 | 2 | 0.5 | Remainder | 0.32 | 21 |
| | 14 | 0.23 | 0.0072 | 0.3 | 4 | 3 | 0.5 | Remainder | 0.37 | 32 |
| | 15 | 0.24 | 0.0085 | 0.4 | 3 | 5 | 0.6 | Remainder | 0.41 | 28 |
| | 16 | 0.24 | 0.0088 | 0.2 | 5 | 2 | 0.7 | Remainder | 0.42 | 27 |
| | 17 | 0.26 | 0.0056 | 0.8 | 3 | 34 | 0.4 | Remainder | 0.37 | 46 |
| | 18 | 0.26 | 0.0071 | 0.1 | 10 | 2 | 0.4 | Remainder | 0.40 | 37 |
| | 19 | 0.26 | 0.0099 | 0.4 | 5 | 5 | 3.2 | Remainder | 0.46 | 26 |
| | 20 | 0.31 | 0.0084 | 2.1 | 1 | 4 | 0.7 | Remainder | 0.48 | 37 |
| Comparative Example | 1 | 0.02 | 0.0000 | 0.6 | 2 | 5 | 0.7 | Remainder | 0.02 | — |
| | 2 | 0.45 | 0.0081 | 0.9 | 25 | 3 | 0.6 | Remainder | 0.61 | 56 |
| | 3 | 0.35 | 0.0896 | 0.1 | 2 | 2 | 0.4 | Remainder | 2.14 | 4 |
| | 4 | 0.22 | 0.0017 | 0.3 | 4 | 3 | 0.6 | Remainder | 0.25 | 129 |
| | 5 | 0.31 | 0.0050 | 16.0 | 2 | 5 | 3.6 | Remainder | 0.41 | 62 |
| | 6 | 0.33 | 0.0090 | 1.0 | 295 | 6 | 2.7 | Remainder | 0.51 | 37 |
| | 7 | 0.34 | 0.0012 | 0.7 | 4 | 163 | 2.1 | Remainder | 0.36 | 283 |
| | 8 | 0.31 | 0.0017 | 2.0 | 7 | 6 | 19.0 | Remainder | 0.34 | 182 |

TABLE 2

| | | Casting Cooling rate (° C./sec.) | Homogenizing Temperature (° C.) | Solutionizing Temperature (° C.) | Rough rolling Rolling reduction rate | Intermediate heat treatment Temperature (° C.) | Finish rolling Thickness (mm) | Finishing heat treatment Temperature (° C.) | Time (min) | Thickness (mm) |
|---|---|---|---|---|---|---|---|---|---|---|
| Invention Example | 1 | 0.6 | 700 | 650 | 92% | 600 | 3.9 | 350 | 1 | 3.5 |
| | 2 | 1.2 | 700 | 600 | 91% | 600 | 4.2 | 350 | 1 | 3.5 |
| | 3 | 1.2 | 700 | 625 | 91% | 575 | 4.5 | 325 | 2 | 3.5 |
| | 4 | 1.2 | 700 | 650 | 91% | 575 | 4.2 | 325 | 2 | 3.5 |
| | 5 | 1.2 | 700 | 625 | 91% | 575 | 4.3 | 325 | 2 | 3.5 |
| | 6 | 1.2 | 700 | 650 | 91% | 600 | 4.2 | 350 | 1 | 3.5 |
| | 7 | 1.2 | 700 | 600 | 91% | 600 | 4.3 | 350 | 1 | 3.5 |
| | 8 | 1.2 | 700 | 625 | 91% | 575 | 4.5 | 325 | 2 | 3.5 |
| | 9 | 1.2 | 700 | 625 | 91% | 600 | 4.2 | 350 | 1 | 3.5 |
| | 10 | 1.2 | 700 | 600 | 91% | 575 | 4.5 | 325 | 2 | 3.5 |
| | 11 | 0.6 | 700 | 600 | 96% | 550 | 2.1 | 300 | 3 | 1.5 |
| | 12 | 1.2 | 700 | 625 | 96% | 600 | 2.1 | 350 | 1 | 1.5 |
| | 13 | 1.2 | 700 | 600 | 95% | 575 | 2.2 | 325 | 2 | 1.5 |
| | 14 | 1.2 | 700 | 625 | 96% | 550 | 2.1 | 300 | 3 | 1.5 |
| | 15 | 1.2 | 700 | 625 | 96% | 550 | 2.1 | 300 | 3 | 1.5 |
| | 16 | 1.2 | 700 | 600 | 96% | 600 | 2.1 | 350 | 1 | 1.5 |
| | 17 | 1.2 | 700 | 650 | 96% | 600 | 2.1 | 350 | 1 | 1.5 |
| | 18 | 1.2 | 700 | 600 | 96% | 575 | 2.1 | 325 | 2 | 1.5 |
| | 19 | 1.2 | 700 | 650 | 96% | 550 | 2.1 | 300 | 3 | 1.5 |
| | 20 | 1.2 | 700 | 650 | 95% | 550 | 2.2 | 300 | 3 | 1.5 |
| Comparative Example | 1 | 1.2 | 700 | 600 | 90% | 575 | 4.7 | 325 | 2 | 3.5 |
| | 2 | 1.2 | 700 | 600 | 90% | 600 | 4.7 | 350 | 1 | 3.5 |
| | 3 | 1.2 | 700 | 600 | Evaluation was stopped due to large edge cracks generated during rough rolling | | | | | |
| | 4 | 1.2 | 700 | 600 | 93% | 575 | 3.6 | 325 | 2 | 3.5 |
| | 5 | 1.2 | 700 | 525 | Evaluation was stopped due to large edge cracks generated during rough rolling | | | | | |
| | 6 | 1.2 | 700 | 600 | 89% | 550 | 5.2 | 300 | 3 | 3.5 |
| | 7 | 1.2 | 700 | 625 | 90% | 600 | 4.9 | 350 | 1 | 3.5 |
| | 8 | 1.2 | 700 | 650 | 90% | 600 | 4.9 | 350 | 1 | 3.5 |

TABLE 3

|  |  | Castability | $(NF_{J2}/(1-NF_{J3}))^{0.5}$ | 0.2% Proof stress (MPa) | Electrical conductivity (% IACS) | Residual stress rate (%) | Bending formability | Punching formability |
|---|---|---|---|---|---|---|---|---|
| Invention Example | 1 | B | 0.37 | 285 | 86.5 | 87 | A | B |
|  | 2 | A | 0.34 | 293 | 86.1 | 91 | A | A |
|  | 3 | A | 0.30 | 314 | 86.1 | 90 | A | A |
|  | 4 | A | 0.35 | 302 | 82.6 | 91 | A | A |
|  | 5 | A | 0.33 | 309 | 81.3 | 90 | A | A |
|  | 6 | A | 0.34 | 298 | 82.8 | 90 | A | A |
|  | 7 | A | 0.32 | 309 | 82.0 | 89 | B | A |
|  | 8 | A | 0.30 | 315 | 82.3 | 89 | B | A |
|  | 9 | A | 0.36 | 296 | 82.0 | 89 | B | B |
|  | 10 | A | 0.30 | 323 | 77.5 | 85 | B | A |
|  | 11 | B | 0.28 | 323 | 86.1 | 84 | A | A |
|  | 12 | A | 0.29 | 327 | 85.7 | 83 | A | A |
|  | 13 | A | 0.25 | 340 | 86.4 | 88 | A | A |
|  | 14 | A | 0.30 | 321 | 82.3 | 85 | A | A |
|  | 15 | A | 0.28 | 328 | 81.8 | 86 | A | A |
|  | 16 | A | 0.29 | 328 | 82.6 | 83 | A | A |
|  | 17 | A | 0.27 | 331 | 82.7 | 86 | B | A |
|  | 18 | A | 0.27 | 335 | 83.2 | 84 | B | A |
|  | 19 | A | 0.30 | 328 | 81.5 | 85 | B | A |
|  | 20 | A | 0.25 | 337 | 77.4 | 83 | B | A |
| Comparative Example | 1 | C | 0.31 | 295 | 97.4 | 32 | — | — |
|  | 2 | B | 0.31 | 342 | 71.3 | — | D | — |
|  | 3 | A | — | — | — | — | — | — |
|  | 4 | A | 0.49 | 257 | 84.0 | — | — | D |
|  | 5 | A | — | — | — | — | — | — |
|  | 6 | A | 0.25 | 346 | 76.2 | — | D | — |
|  | 7 | B | 0.28 | 327 | 78.0 | — | D | — |
|  | 8 | A | 0.28 | 335 | 77.6 | — | D | — |

In Comparative Example 1, the amount of Mg was smaller than the range of the present embodiment, and stress relaxation resistance was low. Accordingly, evaluation of bending formability and punching properties was not conducted.

In Comparative Example 2, since the amount of Mg was larger than the range of the present embodiment, and the value of [Mg]+20×[P] was out of the range of the present embodiment, bending formability was evaluated as "D." Furthermore, electrical conductivity was low. Accordingly, other evaluation tests were not conducted.

In Comparative Example 3, since the amount of P was larger than the range of the present embodiment, and the value of [Mg]+20×[P] was more than 0.5, edge cracks occurred during rolling; and therefore, the subsequent evaluation was stopped.

In Comparative Example 4, since the value of $(NF_{J2}/(1-NF_{J3}))^{0.5}$ was out of the range of the present embodiment, punching properties were poor. Accordingly, evaluation of bending formability was not conducted.

In Comparative Example 5, since the amount of H was larger than the range of the present embodiment, edge cracks occurred during rolling; and therefore, the subsequent evaluation was stopped.

In Comparative Example 6, since the amount of O was larger than the range of the present embodiment, bending formability was insufficient.

In Comparative Example 7, since the amount of S was larger than the range of the present embodiment, bending formability was insufficient.

In Comparative Example 8, since the amount of C was larger than the range of the present embodiment, bending formability was insufficient.

On the contrary, in the invention examples, it was confirmed that 0.2% proof stress, electrical conductivity, stress relaxation resistance, bending formability, castability, and punching formability were excellent.

Based on the above results, according to the invention examples, it was confirmed that it was possible to provide the copper alloy for electronic or electric devices which was excellent in electrical conductivity, strength, bending formability, stress relaxation resistance, castability, and punching formability; and the copper alloy plate or strip material for electronic or electric devices.

INDUSTRIAL APPLICABILITY

The copper alloy for electronic or electric devices and the copper alloy plate or strip material for electronic or electric devices of the present embodiment can be suitably applied to the component for electronic or electric devices, for example, a terminal such as a connector or a press-fit connector, a busbar, or the like.

What is claimed is:

1. A copper alloy for electronic or electric devices, comprising:
   Mg in a range of 0.15 mass % or greater and less than 0.35 mass %; and
   P in a range of 0.0005 mass % or greater and less than 0.01 mass %,
   with a remainder being Cu and unavoidable impurities,
   wherein an amount of Mg [Mg] and an amount of P [P] in terms of mass ratio satisfy relations:

[Mg]+20×[P]<0.5 and 25<[MMg]/[P], an amount of H is 10 mass ppm or less, an amount of O is 100 mass ppm or less, an amount of S is 50 mass ppm or less, and an amount of C is 10 mass ppm or less, all of which are the unavoidable impurities, and
   a surface orthogonal to a rolling width direction is used as an observation surface, measurement regarding a matrix is performed on a measurement area of 10,000μ $m_2$ or larger at every measurement intervals of 0.25 μm by an EBSD method, measured results are analyzed by data analysis software OIM Data Analysis ver. 7.2 manufactured by EDAX/TSL (current AMETEK) to obtain a CI value in each measurement point, a measurement point in which a CI value is 0.1 or less is removed, a boundary having more than 15° of an orientation difference between neighboring measuring points is assigned as a grain boundary, a coincidence boundary in which a Σ value is 29 or less is defined as a special grain boundary, and the remaining grain boundaries are defined as random grain boundaries, then, with regard to grain boundary triple junctions analyzed by the OIM, $0.20<(NF_{J2}/(1-NF_{J3}))_{0.5} \leq 0.45$ is satisfied in a case where a proportion of J3, in which all three grain boundaries constituting a grain boundary triple junction are special grain boundaries, to total grain boundary triple junctions is represented by $NF_{J3}$, and a proportion of J2, in which two grain boundaries constituting a grain boundary triple junction are special grain boundaries and one grain boundary is a random grain boundary, to the total grain boundary triple junctions is represented by NFJ2.

2. The copper alloy for electronic or electric devices according to claim 1, wherein an electrical conductivity is greater than 75% IACS.

3. The copper alloy for electronic or electric devices according to claim 1, wherein the amount of Mg [Mg] and the amount of P [P] in terms of mass ratio satisfy a relation:

[Mg]/[P]≤400.

4. The copper alloy for electronic or electric devices according to claim 1, wherein a 0.2% proof stress measured by performing a tensile test in a direction parallel to a rolling direction is 200 MPa or greater.

5. The copper alloy for electronic or electric devices according to claim 1, wherein a residual stress rate is 75% or greater under conditions of 150° C. for 1,000 hours.

6. A copper alloy plate or strip material for electronic or electric devices, comprising:

the copper alloy for electronic or electric devices according to claim 1, wherein a thickness of the copper alloy plate or strip material is more than 0.5 mm.

7. The copper alloy plate or strip material for electronic or electric devices according to claim 6, further comprising a Sn plating layer or a Ag plating layer on a surface thereof.

8. A component for electronic or electric devices, comprising the copper alloy plate or strip material for electronic or electric devices according to claim 6.

9. A terminal comprising the copper alloy plate or strip material for electronic or electric devices according to claim 6.

10. A busbar comprising the copper alloy plate or strip material for electronic or electric devices according to claim 6.

* * * * *